United States Patent [19]

McInturff et al.

[11] Patent Number: 4,509,367
[45] Date of Patent: Apr. 9, 1985

[54] TACHOMETER GENERATOR INDEXING DEVICE

[75] Inventors: Joe A. McInturff; David W. Patterson, both of Marietta, Ga.

[73] Assignee: Lockheed Corporation, Burbank, Calif.

[21] Appl. No.: 493,063

[22] Filed: May 9, 1983

[51] Int. Cl.³ .............................................. G01M 1/00
[52] U.S. Cl. ...................................... 73/457; 73/466; 324/161
[58] Field of Search ................... 73/457, 466; 324/161, 324/158 MG

[56] References Cited

U.S. PATENT DOCUMENTS 2,816,445 12/1957 Rambo .................................. 73/466

Primary Examiner—James J. Gill
Attorney, Agent, or Firm—Eric R. Katz

[57] ABSTRACT

A device for indexing a rotor (17) of a machine (13) to be balanced utilizes the output signal (A) from a generator (15) connected to the machine rotor (17). The generator (15) produces a continuous sinusoidal output signal (A) proportional to the position and speed of the associated rotor (17). Detector means (37) detect a predetermined output from the generator (15) so that an indicator (41) issues an indication each time the detector means (37) detects the predetermined output. Thus, an operator can physically index the angular position of the rotor (17) with respect to the predetermined output (A) from the generator (15) when an indication is provided so that the position of the rotor (17) is referenced to the output signal (A) of the generator (15).

7 Claims, 3 Drawing Figures

TACHOMETER GENERATOR INDEXING DEVICE

TECHNICAL FIELD

This invention generally relates to balancing techniques for rotary machinery and more particularly to a device for indexing a rotor of a machine to be balanced to the output of a tachometer generator.

BACKGROUND ART

During the operation of rotary machinery, it is essential that the rotating elements of the machine be in dynamic balance thereby limiting unwanted vibrational forces. Because these vibrational forces are proportional to the mass and square of the speed of rotation, precautions should be taken to insure dynamic balance and prevent excessive vibration which can result in undue wear and premature breakdown and failure.

The present invention has general utility and application to a wide variety of machinery wherein vibration testing is important; however, its structure and function are best appreciated when related to an aircraft. In the aircraft industry, engines are employed which have massive moving parts or rotors in the form of fans or turbines that rotate at relatively high angular velocities. Engine failure due to rotor imbalance can result in serious damage to the aircraft as well as its occupants and therefore, it is desirable to monitor the operation of these engine rotors in order to rectify an out-of-balance condition prior to failure.

U.S. Pat. No. 4,010,637, assigned to the Lockheed Corporation, assignee of the present invention, discloses a system for monitoring engine vibrations utilizing an uniform level filter to condition the output signal from an accelerometer vibration transducer mechanically coupled to the engine. The filter is adjusted in advance to receive different engine rotor frequencies which are then modulated or combined into a single output relative to any of several g-forces of interest. Thus, a single limit output is established and preset which if exceeded alerts an operator to an out-of-balance condition.

The arrangement noted above is operationally quite efficient, but does possess certain definite disadvantages. The arrangement fails to determine the degree of imbalance of the defective rotor and the specific location of the weight to be added to that rotor to compensate for such imbalance. As a result, the balancing techniques that are used to rectify the out-of-balance condition are trial and error in nature, requiring several test runs. This approach is not only time consuming and expensive, but also contributes to unwanted wear and tear on the engine due to operation at high vibration levels.

A method has been developed and is disclosed in U.S. Pat. No. 4,238,960, assigned to Lockheed Corporation, which reduces maintenance cost and downtime for rotor balancing by utilizing inflight data to determine corrective weight magnitude as well as position. Unlike the first mentioned patented system, the second patented system employs a tachometer generator mechanically coupled to the engine which outputs a waveform proportional to the position and speed of the rotor. A processor is employed to convert the fundamental vibration signal into its separate fundamental frequencies utilizing well known fast Fourier transform techniques. By determining the phase relationship of the vibration frequency component of interest to that of the generator signal, it is possible to determine the corrective weight magnitude and location when an imbalance condition exists.

In the above described balancing technique, the tachometer generator is indexed to the rotor so that as the rotor turns one revolution, the tachometer outputs a sinewave of one cycle. By physically indexing the tachometer generator output to an index/mark on the rotor, the position of the rotor is described by the output of the tachometer generator. Thus, the phase relationship between the tachometer generator output and the rotor vibration signal determines the physical location of the rotor unbalance.

Heretofore, the indexing of the rotor has been achieved by determining which fan blade of the rotor is aligned with the north pole of the windings of the tachometer generator. Typically, a hand magnet or compass is used and the procedure requires the removal of the primary exhaust plug which is held in place by approximately forty screws. The removal of these screws creates unnecessary rework when screws break due to crystallization caused by engine exhaust heat. Moreover, it has been determined that the tachometer generator windings embedded in the housing can be oriented differently from engine to engine thus creating errors during indexing of the rotor.

DISCLOSURE OF THE INVENTION

Accordingly, it is an object of the present invention to provide a tachometer generator indexing device whereby an operator can physically index the angular position of a rotor to a predetermined output of a generator so that the angular position of the rotor is referenced to the output signal of the generator.

Another object of the present invention is to provide a tachometer generator indexing device for indexing a rotor of a machine to the output of a generator as well as a predetermined point on the housing of the machine wherby the angular position of the rotor is referenced to the output signal of the generator.

Another object of the present invention is to provide a tachometer generator indexing device for indexing a rotor of a machine to the generator whereby the angular position of the rotor is referenced to and described by the output signal of the generator.

An important feature and significant advantage of the present invention is the ease of utilization due to the provision of a connector adapted to engage the output plug of the tachometer generator thus providing a quick and easy method for indexing only requiring the opening of the engine cowling and the connection of the indexing device to the generator output plug.

A further important feature of the present invention is the provision of a stroboscopic arrangement wherein the indicator comprises a strobe light which is adapted to be oriented to a position adjacent to a predetermined point on the engine housing, i.e. the mounting position of the vibration accelerometer, so that when the rotor is rotated by hand, the fan blade that passes the predetermined point is strobed and referenced to the generator output as well as a predetermined point on the engine housing. The rotation of the fan rotor by hand is slow enough that the particular fan blade that is illuminated can be easily determined without the use of any reflective materials or other devices.

One advantage of the present invention is that the indexing procedure is predicated on the output from the generator and is independent of the physical orientation of generator windings.

Another advantage of the present invention is that the indexing device significantly reduces time and labor costs when used in conjunction with the means for balancing disclosed by U.S. Pat. No. 4,238,960.

In accordance with the present invention there is provided a device for indexing a rotor of a machine having a housing, the device including a generator adapted to be connected to the machine for producing a continuous sinusoidal output signal proportional to the position and speed of the associated rotor; detector means for detecting a predetermined output from said generator; and an indicator for providing an indication each time the detector means has detected the predetermined output from the generator. This device allows an operator to physically index the angular position of the rotor with respect to the predetermined output of the generator so that the angular position of the rotor is referenced to the output signal of the generator.

In accordance with the present invention there is also provided in a machine having a rotor, a machine housing and a generator connected to the machine for producing a continuous sinusoidal output signal proportional to the position and speed of the associated rotor, an indexing device comprising connection means for operatively connecting the indexing device to the output of the generator; detector means for detecting a predetermined output from the generator; and an indicator for providing an indication each time the detector means has detected the predetermined output from the generator so that an operator can physically index the angular position of the rotor with respect to the predetermined output of the generator as well as a predetermined point on the machine housing whereby the angular position of the rotor is referenced to and described by the output signal of the generator.

These and other objects, advantages and features of the present invention will be apparent as the following description proceeds with particular reference to the application drawings.

BEST MODE OF CARRYING OUT THE INVENTION

Figure 1:
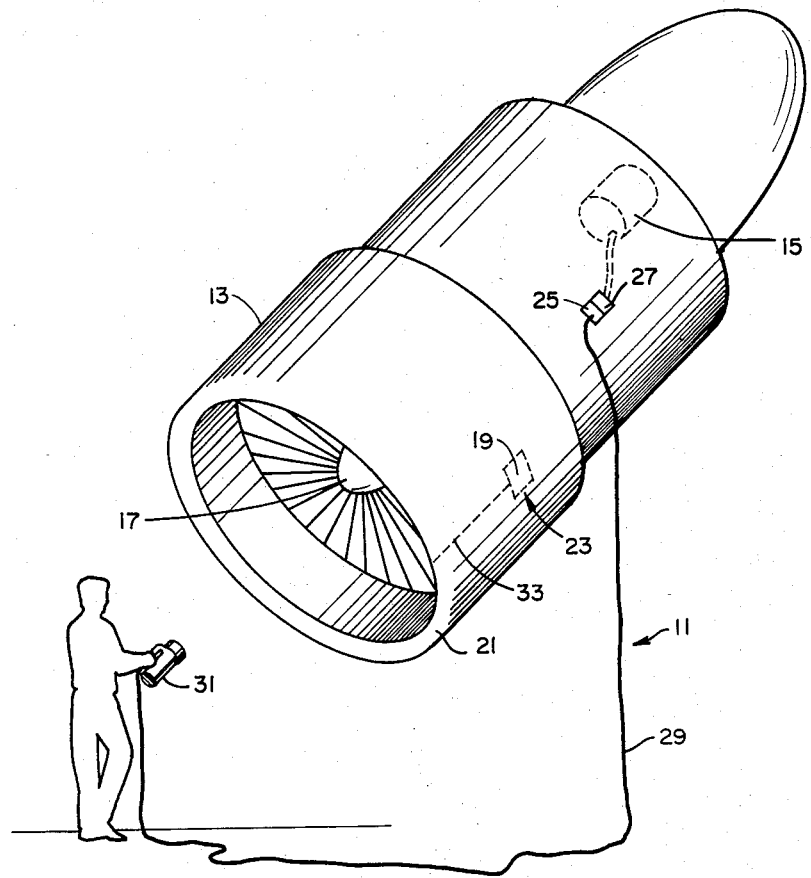
FIG. 1 is a perspective view illustrating the indexing device of the present invention connected to an engine to be balanced.

Referring to FIG. 1, the indexing device of the present invention, generally indicated at 11, is illustrated connected to a turbojet engine 13 to be balanced. In the arrangement shown, a tachometer generator 15 is directly coupled to fan rotor 17 and outputs a continuous sinusoidal signal proportional to the position and speed of the associated rotor 17.

A direct connection is provided between rotor 17 and generator 15 and in the event that no generator exists, a generator of conventional design would be used. The tachometer generator 15 outputs a sinewave of one cycle each time the rotor 17 turns through one complete revolution. By physically indexing the tachometer generator 15 to an index/mark on the rotor 17, the position of the rotor 17 is described by the output signal of the tachometer generator 15.

Also shown is an accelerometer transducer 19 mechanically coupled to rotor housing 21 as indicated at 23. The transducer 19 is sensitive to the vibration components of the fan rotor 17 and outputs a composite signal which is proportional to the second derivative of the displacement of these components. As in U.S. Pat. No. 4,010,637, the entire disclosure of which is herein incorporated by reference, an amplifier and uniform level filter (not shown) conditions the vibration signal whereby a signal exceedance limit is established.

The waveform output from the amplifier/filter is a function of the position of rotor unbalance and is directly relatable to the index/mark on the rotor 17, the position of the rotor 17 being described by the output of the tachometer generator 15. By processing the rotor vibration signal output from the amplifier/filter and the tachometer signal from the rotor tachometer generator 15 in accordance with the teachings of U.S. Pat. No. 4,238,960, the entire disclosure of which is herein incorporated by reference, the actual angle of the unbalance with respect to the rotor index/mark is the phase shift between the two signals.

In order to describe the position of rotor 17 in terms of the output from generator 15, it is necessary to physically reference the output signal from generator 15 to an index/mark on the rotor 17. The referencing of the angular position of the rotor 17 to the output from generator 15 is achieved, according to the present invention, by connecting the indexing device 11 via connector 25 to output plug 27 of generator 15. Cable 29 is flexible to allow an operator to remotely locate indicator 31 of indexing device 11.

The indicator 31, illustrated in FIG. 1, is an illumination device such as a strobe light or flash light, however, as is understood by one of ordinary skill, the indicator 31 alternatively comprises any suitable indicator, audio or visual in nature.

Figure 3:
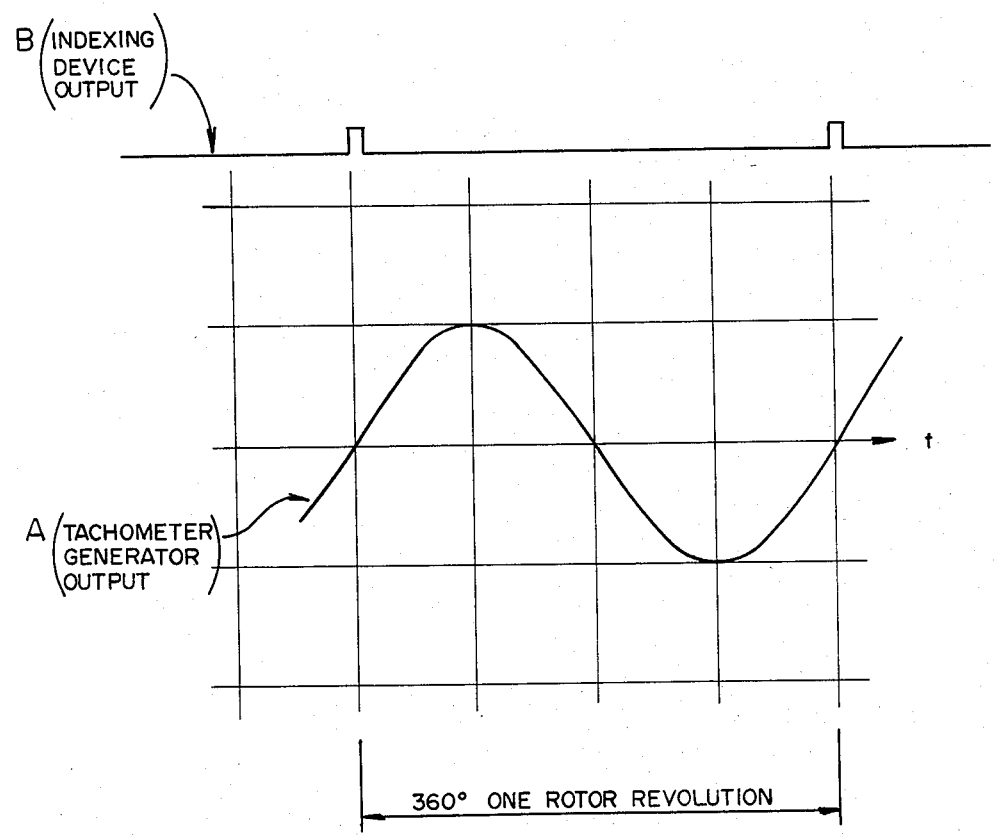
FIG. 3 is a waveform diagram illustrating the relationship between the output of the tachometer generator and the indexing device.

Referring to FIG. 3, as the engine rotor 17 is rotated in a clockwise direction, as defined by looking into the engine, the tachometer generator 15, generates a sinewave output similar to waveform A. The indexing device 11 is such that each time waveform A passes through a predetermined output, for example, the zero crossover point going from negative to positive, the indexing device 11 provides an output indication, for example, a flash of light, in accordance with waveform B.

By positioning the indicator 31 along ghost line 33, relative to the mounting position of transducer 19, as the rotor is turned, the indicator 31 is activated and illuminates the particular fan blade that is passing the transducer position 23. Thus, the operator can physically mark the illuminated fan blade so that the angular position of the rotor is referenced or indexed to a predetermined output of the generator as well as a predetermined point on the housing of the engine such that the position of the rotor is described by the generator signal.

Figure 2:
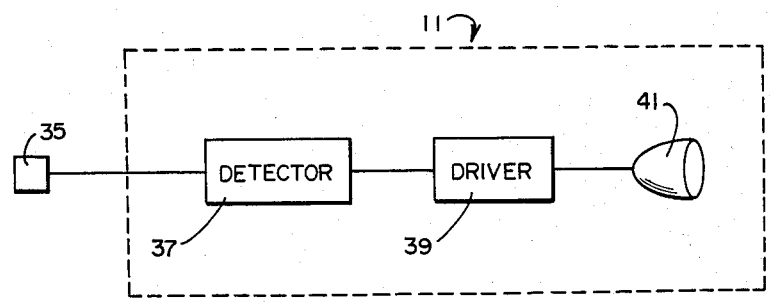
FIG. 2 is a block diagram of the indexing device in accordance with the teachings thereof to illustrate the essential elements and interaction thereof.

As shown in FIG. 2, the indexing device 11 comprises a connection means 35 for connecting device 11 to the output of the generator 15. Detector means 37 receives the output signal from the generator 15 and detects a predetermined output from the generator 15. Detector means 37 comprises, for example, a zero crossover detector which is adapted to provide an output when the generator signal undergoes a negative to positive signal transition.

An indicator driver 39 receives the output from detector means 37 and drives indicator 41 so as to provide an indication each time the predetermined output from the generator 15 is detected. Thus, the operator can physically index the angular position of the rotor 17 to a predetermined output of the generator 15 so that the position of the rotor is referenced to the output of the generator 15.

While the invention has been particularly shown and described herein, it will be understood by those of ordinary skill in the art that various changes in form and detail may be made therein without departing from the spirit and scope of the invention as defined by the appended claims.

We claim:

1. In a machine having a rotor with a plurality of associated fan blades, a housing, an accelerometer, and a generator connected to the machine for generating a continuous sinusoidal output signal proportional to the position and speed of the associated rotor, an indexing device comprising:
   (a) connection means for operatively connecting said device to the output of the generator;
   (b) detector means for detecting a predetermined output from said generator, said predetermined output being the zero crossover point of the sinusoidal output signal of said generator going from negative to positive;
   (c) an indicator for providing a stroboscopic flash each time said detector means has detected said predetermined output from said generator;
   (d) a predetermined point on the housing of the machine for indicating the mounting position of the accelerometer;
   (e) said indicator being adapted to be oriented to a position adjacent to said predetermined point on the housing;
   whereby said indicator is positioned relative to the mounting position of the accelerometer so as the rotor is turned, said indicator is activated when said predetermined output is detected, and illuminates the particular fan blade that is passing by the accelerometer position so that an operator can physically index the angular position of the rotor to said predetermined output from said generator as well as said predetermined point on the housing.

2. The device of claim 1, further comprising means for driving said indicator.

3. The device of claim 2, wherein said indicator is an audio device.

4. A device for indexing a rotor of a machine having a plurality of fan blades associated with the rotor, a housing, and an accelerometer, said device comprising:
   (a) a generator adapted to be connected to the machine rotor for producing a continuous sinusoidal output signal proportional to the position and speed of the associated rotor;
   (b) detector means for detecting a predetermined output from said generator, said predetermined output being the zero crossover point of the sinusoidal output signal of said generator going from negative to positive;
   (c) an indicator for providing a stroboscopic flash each time said detector means has detected said predetermined output from said generator;
   (d) a predetermined point on the housing of the machine for indicating the mounting position of the accelerometer;
   (e) said indicator being adapted to be oriented to a position adjacent to said predetermined point on the housing;
   whereby said indicator is positioned relative to the mounting position of the accelerometer so as the rotor is turned, said indicator is activated when said predetermined output is detected and illuminates the particular fan blade that is passing by the accelerometer position so that an operator can physically index the angular position of the rotor to said predetermined output of said generator as well as said predetermined point on the housing.

5. The device of claim 4, wherein said detector means comprises a zero crossover detector for providing an output each time the output signal of said generator goes through zero from negative to positive.

6. The device of claim 5, wherein said indicator is adapted to be portable such that the operator can position said indicator remotely.

7. The device of claim 6, wherein said indicator is an audio device.

* * * * *